(12) United States Patent
Schuessler et al.

(10) Patent No.: US 9,878,699 B2
(45) Date of Patent: Jan. 30, 2018

(54) THROTTLE DISK OF A HYDRAULIC ASSEMBLY OF A VEHICLE BRAKE SYSTEM

(71) Applicant: Robert Bosch GmbH, Stuttgart (DE)

(72) Inventors: Michael Schuessler, Seckach (DE); Oliver Gaertner, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 72 days.

(21) Appl. No.: 14/489,840

(22) Filed: Sep. 18, 2014

(65) Prior Publication Data

US 2015/0076379 A1    Mar. 19, 2015

(30) Foreign Application Priority Data

Sep. 19, 2013 (DE) .......................... 10 2013 218 797

(51) Int. Cl.
| | |
|---|---|
| *F16K 47/04* | (2006.01) |
| *B60T 17/04* | (2006.01) |
| *F16K 15/04* | (2006.01) |
| *F16K 47/08* | (2006.01) |

(52) U.S. Cl.
CPC ............ *B60T 17/04* (2013.01); *F16K 15/044* (2013.01); *F16K 47/08* (2013.01)

(58) Field of Classification Search
CPC ......... F16K 47/08; F16K 15/044; B60T 17/04
USPC .... 137/512, 512.3, 851, 855, 859, 535, 539, 137/540; 251/120
See application file for complete search history.

(56) References Cited

U.S. PATENT DOCUMENTS

| | | | | |
|---|---|---|---|---|
| 2,864,394 | A * | 12/1958 | Hempel ................. | A01G 25/16 137/517 |
| 3,084,707 | A * | 4/1963 | Frye ........................ | F15B 13/04 137/516.25 |
| 4,479,508 | A * | 10/1984 | Breed ................. | F04B 53/1025 137/516.25 |
| 7,191,793 | B2 * | 3/2007 | Maula ...................... | F16K 7/14 137/341 |
| 2013/0224046 | A1 * | 8/2013 | Fellmeth ............... | B60T 8/4031 417/295 |

FOREIGN PATENT DOCUMENTS

| | | |
|---|---|---|
| CN | 201202884 Y | 3/2009 |
| CN | 103080549 A | 5/2013 |

* cited by examiner

*Primary Examiner* — Craig Schneider
*Assistant Examiner* — P. Macade Nichols
(74) *Attorney, Agent, or Firm* — Maginot, Moore & Beck LLP

(57) ABSTRACT

In a throttle disk of a dynamic throttle of a hydraulic assembly of a vehicle brake system, with at least one disk surface which is formed by a rigid material, a layer of elastic material is at least partially formed on the disk surface.

11 Claims, 2 Drawing Sheets

THROTTLE DISK OF A HYDRAULIC ASSEMBLY OF A VEHICLE BRAKE SYSTEM

This application claims priority under 35 U.S.C. § 119 to application no. DE 10 2013 218 797.1, filed on Sep. 19, 2013 in Germany, the disclosure of which is incorporated herein by reference in its entirety.

BACKGROUND

The disclosure relates to a throttle disk of a dynamic throttle of a hydraulic assembly of a vehicle brake system, with at least one disk surface which is formed by a rigid material. The disclosure relates, furthermore, to a use of such a throttle disk in a hydraulic assembly of a vehicle brake system.

Vehicle brake systems of modern motor vehicles, in particular of passenger cars, are equipped with externally controlled regulation of the brake pressure on associated wheel brakes. For this purpose, the vehicle brake systems have a hydraulic assembly in which, by means of pump elements, brake fluid can be conveyed under pressure to the wheel brakes or sucked away from these. The pump elements are configured as piston pumps, the pumping action of which pulses with the movement of the associated pump piston. In order to mitigate the resulting pulsation of the brake fluid stream, it is known to arrange a throttle disk in a fluid line of the vehicle brake system. The throttle disk can be deformed by the brake fluid stream and smoothing of the pressure profile in the fluid stream can thereby be achieved. For this purpose, the throttle disk is produced from comparatively rigid material, usually steel.

SUMMARY

According to the disclosure, a throttle disk of a dynamic throttle of a hydraulic assembly of a vehicle brake system is provided, with at least one disk surface which is formed by a rigid material and on which a layer of elastic material is at least partially formed.

The rigid material used is in this case, in particular, steel having a modulus of elasticity of between 180 000 and 220 000 N/mm$^2$, especially preferably of 200 000 N/mm$^2$.

By means of the throttle disk according to the disclosure, this has formed on it a surface portion on which is located not the rigid material affording the throttle action, but instead an elastic material which is considerably softer in comparison with this. The throttle disk according to the disclosure then bears with this material, in particular, against an adjacent component. Deformation and subsequent reverse deformation of the throttle disk according to the disclosure then gives rise to the situation where the throttle disk does not butt against the adjacent component with rigid hard material, but instead with soft elastic material. As a result, when the associated hydraulic assembly is in operation, less noise arises during the deformation and the reverse deformation of the throttle disk according to the disclosure than is the case in conventional throttle disks. Better noise characteristic values can therefore be achieved by means of the throttle disk according to the disclosure. Furthermore, with an appropriate configuration and placement, the throttle disk according to the disclosure has an increased sealing action, as a result of which the closing momentum intended by it can also be reduced. These functions of the throttle disk according to the disclosure also have an advantageous effect upon its throttling function and also upon its noise behavior. At the same time, the throttle disk according to the disclosure can be produced very cost-effectively and can be installed in the customary tried-and-tested way.

Preferably, in the throttle disk according to the disclosure, its disk surface is configured in the form of a ring with a first disk side and with an opposite second disk side, and the layer of elastic material is formed only at the radially outer margin of the first disk side. The throttle disk, as such, is therefore covered only partially with elastic material, specifically, in particular, only at its outer margin. As explained above, in its position of rest, the throttle disk can then be laid against an adjacent component at this outer margin. By means of its comparatively rigid material, it is deflected resiliently out of the position of rest on account of fluid pressure and subsequently moves back into the position of rest again, the elastic material then butting against the adjacent component and sealing off there.

Furthermore, advantageously, the layer of elastic material can also be formed at the radially outer margin of the second disk side. Such a layer, formed only in regions, of elastic material on the throttle disk according to the disclosure can be produced especially cost-effectively and affords the largely identical effect according to the disclosure, particularly when the throttle disk bears only at its outer margin against another component in order to fulfill its throttling function.

Alternatively, the throttle disk according to the disclosure is configured on its disk surface in the form of a ring with a first disk side and with an opposite second disk side, and the layer of elastic material is formed on the entire area of the first disk side. Preferably, the layer of elastic material is then also formed on the entire area of the second disk side.

The layer of elastic material according to the disclosure is preferably configured with ethylene-propylene-diene rubber (EPDM, ethylene-propylene-diene monomer). This material has a very good heat and cold behavior, has high ozone resistance and, furthermore, is resistant to aqueous chemicals.

Furthermore, according to the disclosure, an elastic material is especially preferably used which has a modulus of elasticity of 15 to 20 N/mm$^2$, in particular of 17.5 N/mm$^2$ By means of such material, both the desired throttling action and the intended noise reduction can be optimally achieved.

The disclosure is also correspondingly aimed especially at a use of such a throttle disk according to the disclosure in a hydraulic assembly of a vehicle brake system.

In such a use, the throttle disk is preferably arranged downstream of an outlet valve of a pump element of the hydraulic assembly. The throttle disk is therefore located directly behind the outlet valve in the flow direction and provides the intended reduction in the pressure pulsation there directly behind the pump element along the flow path.

The throttle disk is in this case advantageously arranged in a flow duct of the hydraulic assembly such that it experiences the onflow on one of its disk sides and is deflected transversely to the disk side by the onflow. The throttle disk therefore experiences the onflow transversely to its plate-shaped extent. It consequently has a large onflow surface, upon which the onflowing pulsating fluid can act correspondingly. At the same time, the elastic material attached according to the disclosure to the disk side acts itself as a pulsation damper and, furthermore, reduces the noise behavior of the throttle disk during its deformation and when it butts against adjacent components.

Accordingly, it is especially preferred, according to the disclosure, that the throttle disk experiences the onflow on that disk side on which the layer of elastic material is located.

BRIEF DESCRIPTION OF THE DRAWINGS

Exemplary embodiments of the disclosure are presented in the drawings and are explained in more detail in the description below.

In the drawings.

DETAILED DESCRIPTION

Figure 1:
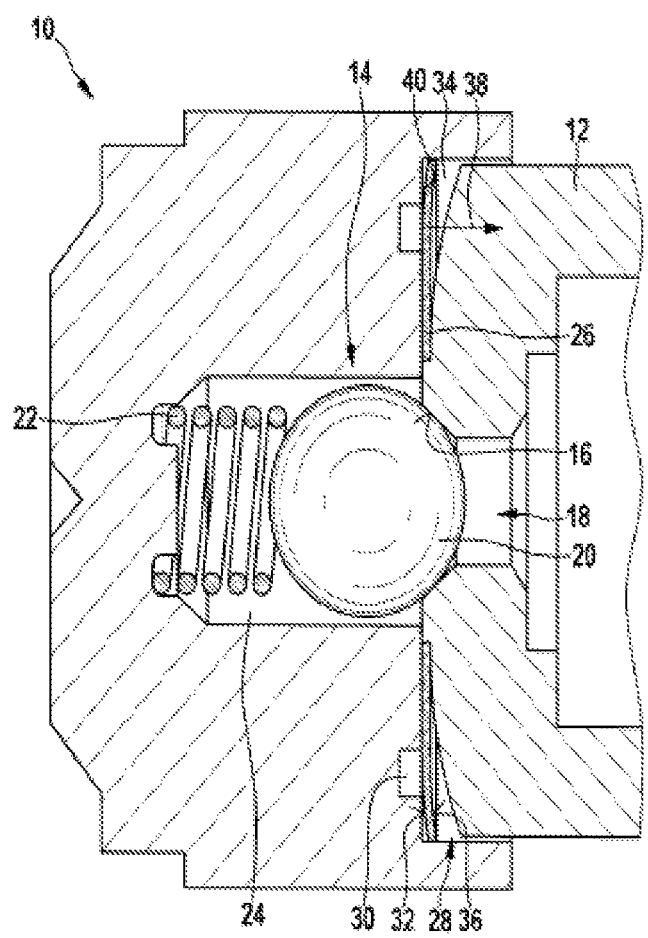
FIG. 1 shows a longitudinal section of part of a pump element according to the disclosure of a hydraulic assembly of a vehicle brake system with a throttle disk arranged there.

The figures illustrate a portion of a pump element 10 of a hydraulic assembly of a vehicle brake system. The pump element 10 is configured with a pump cylinder 12, on the end-face cylinder bottom of which is located an outlet valve 14. The outlet valve 14 is configured with a valve seat 16 which is formed in the cylinder bottom and which frames an annular valve port 18.

The valve port 18 can be closed selectively by a spherical valve body 20 which is forced against the valve seat 16 by means of a valve spring 22.

In the flow direction of a fluid flowing out through the outlet valve 14, that is to say downstream of the valve port 18, is located an outlet duct 24 which surrounds the valve body 20 and which leads to an annular throttle disk 26. The throttle disk 26 has an essentially plate-shaped configuration, is made from a steel material and extends in a likewise annular throttle space 28, into which the outflowing fluid flows through an onflow duct 30 on the left side with respect to FIG. 1.

The fluid in this case passes through the onflow duct 30 onto a first disk side 32 or end face of the throttle disk 26, which consequently forms a disk surface, in particular an onflow side of the throttle disk 26. The fluid then has to flow around the throttle disk 26 before it can flow on a second opposite disk side 36, as a disk side or end face of the throttle disk 26, on its outflow side through an outflow duct 34 and out of the throttle space 28 again on the right side with respect to FIG. 1.

The outflowing fluid, when it flows around, deflects the throttle disk 26 transversely to its disk plane in the direction of an arrow 38, in particular, by virtue of its pulsating flow caused by the pump cylinder 12. The throttle disk 26 is subsequently deformed back into its initial position again.

In this initial position, the throttle disk 26 bears with its first disk side 32 against a bearing edge 40, so that a backing-up region is formed at this bearing edge 40 when the outflowing fluid flows onto it. The throttle disk 26 is therefore repeatedly lifted off briefly from the bearing edge 40, is deformed into the outflow duct 34 on the second disk side 36 and then goes back onto the bearing edge 40 again.

In order, during this movement of the throttle disk 26, to improve overall, in particular, its noise behavior at the bearing edge 40 and also its dynamic behavior, the throttle disk 26 is configured on at least one of its disk sides 32 or 36 with a layer 42 of elastic material. In the present case, the elastic material is EPDM which is applied in a layer thickness of between 0.2 mm and 0.6 mm, preferably 0.4 mm, to the otherwise as far as possible rigid steel material of the throttle disk 26.

Figure 2:
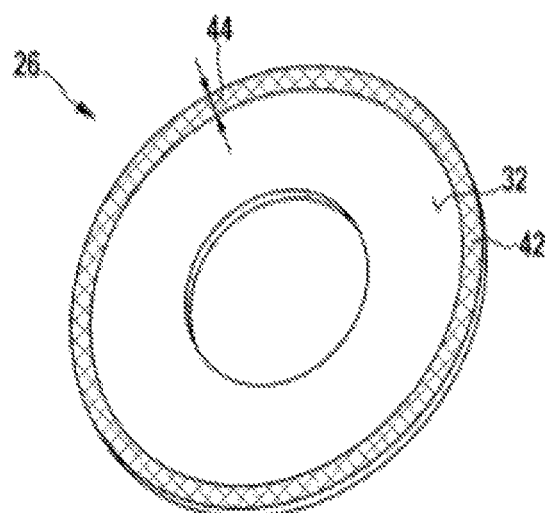
FIG. 2 shows a perspective view of a first exemplary embodiment of a throttle disk according to FIG. 1.

In the exemplary embodiment according to FIG. 2, the layer 42 of elastic material is applied only at a radially outer margin 44 of the annular throttle disk 26.

Figure 3:
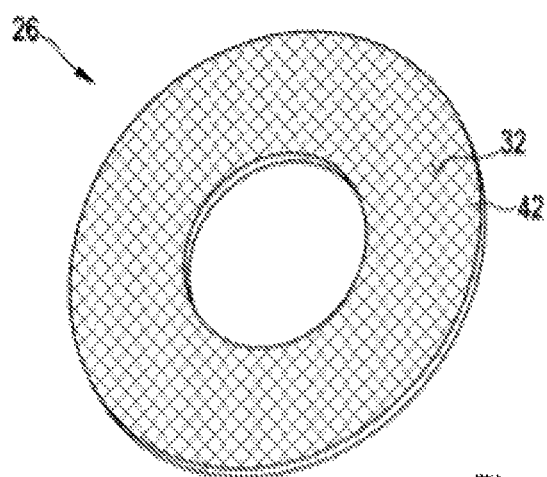
FIG. 3 shows a perspective view of a second exemplary embodiment of a throttle disk according to FIG. 1.

In the exemplary embodiment according to FIG. 3, by contrast, the layer 42 of elastic material extends over the entire first disk side 32 or front side of the throttle disk 26.

The rear side or second disk side 36 of the throttle disk 26 is also advantageously coated with elastic material at the margin 44 or over the entire area. By means of such a configuration, the resilient behavior of the throttle disk 26 when it is deflected in the throttle space 28 away from the bearing edge 40 and back to this bearing edge 40 can be further improved.

Furthermore, the elastic coating on the otherwise comparatively rigid throttle disk 26 improves its sealing action at the bearing edge 40. The closing momentums of the throttle disk 26 are reduced, thus leading, in particular, to an improvement in its noise behavior.

Moreover, a coating of elastic material on the throttle disk 26 over the area of the latter improves the flow of outflowing fluid around it and reduces the occurrence of turbulences on its surface. The flow of the outflowing fluid is consequently smoothed out further and pulsations can be additionally avoided.

What is claimed is:

1. A throttle disk of a dynamic throttle of a hydraulic assembly of a vehicle brake system, the throttle disk comprising:
    an annular ring having a continuous circular circumference, the annular ring including a rigid material and a layer of elastic material at least partially formed upon the rigid material, the annular ring having a first disk side and a second disk side,
    wherein the throttle disk is configured to be deformed by an onflow in the direction of both the first disk side and the second disk side.

2. The throttle disk according to claim 1, wherein:
    the layer of elastic material is formed at a radially outer margin of the first disk side.

3. The throttle disk according to claim 1, wherein the layer of elastic material is further formed at a radially outer margin of the second disk side.

4. The throttle disk according to claim 1, wherein:
    the layer of elastic material is formed on an entire area of the first disk side.

5. The throttle disk according to claim 4, wherein the layer of elastic material is further formed on an entire area of the second disk side.

6. The throttle disk according to claim 1, wherein the layer of elastic material comprises an ethylene-propylene-diene rubber.

7. A hydraulic assembly of a vehicle brake system comprising:
    a throttle disk comprising:
        an annular ring having a continuous circular circumference, the annular ring including a rigid material and a layer of elastic material at least partially formed upon the rigid material, the annular ring having a first disk side and a second disk side,
    wherein the throttle disk is configured to be deformed by an onflow in the direction of both the first disk side and the second disk side.

8. The hydraulic assembly according to claim 7, further comprising:
    a pump element having an outlet valve,
    wherein the throttle disk is arranged downstream of the outlet valve.

9. The hydraulic assembly according to claim 7, further comprising:
   a flow duct, wherein:
      the throttle disk is arranged in the flow duct such that it experiences an onflow on at least one of the first disk side and the second disk side and is deflected transversely to the at least one of the first disk side and the second disk side by the onflow.

10. The hydraulic assembly according to claim 9, wherein the layer of elastic material is at least partially formed on the least one of the first disk side and the second disk side which experiences the onflow.

11. The hydraulic assembly according to claim 7, wherein the throttle disk is configured to be deflected in a direction parallel to the longitudinal axis.

\* \* \* \* \*